US012715337B2

(12) United States Patent
Despesse et al.

(10) Patent No.: US 12,715,337 B2
(45) Date of Patent: Aug. 25, 2026

(54) ELECTRIC POWER SUPPLY SYSTEM

(71) Applicants: COMMISSARIAT A L'ENERGIE ATOMIQUE ET AUX ENERGIES ALTERNATIVES, Paris (FR); Schaeffler Technologies AG & Co. KG, Herzogenaurach (DE)

(72) Inventors: Ghislain Despesse, Grenoble Cedex (FR); Sylvain Bacquet, Grenoble Cedex (FR); Jérôme Lachaize, Toulouse (FR); Damien Verdier, Toulouse (FR); Nicolas Leto, Toulouse (FR)

(73) Assignees: COMMISSARIAT A L'ENERGIE ATOMIQUE ET AUX ENERGIES ALTERNATIVES, Paris (FR); Schaeffler Technologies AG & Co. KG, Herzogenaurach (DE)

( * ) Notice: Subject to any disclaimer, the term of this patent is extended or adjusted under 35 U.S.C. 154(b) by 688 days.

(21) Appl. No.: 18/251,190

(22) PCT Filed: Nov. 2, 2021

(86) PCT No.: PCT/EP2021/080311
§ 371 (c)(1),
(2) Date: Apr. 28, 2023

(87) PCT Pub. No.: WO2022/090558
PCT Pub. Date: May 5, 2022

(65) Prior Publication Data

US 2024/0278688 A1 Aug. 22, 2024

(30) Foreign Application Priority Data

Nov. 2, 2020 (FR) ...................................... 2011226

(51) Int. Cl.
*B60L 58/20* (2019.01)
*B60L 58/12* (2019.01)
(Continued)

(52) U.S. Cl.
CPC ............... *B60L 58/20* (2019.02); *B60L 58/12* (2019.02); *B60L 58/21* (2019.02); *B60L 58/22* (2019.02);
(Continued)

(58) Field of Classification Search
CPC .......... B60L 58/20; B60L 58/12; B60L 58/21; B60L 58/22; B60L 2240/547; H02J 7/56;
(Continued)

(56) References Cited

U.S. PATENT DOCUMENTS 7,075,194 B2 * 7/2006 Weidenheimer .......... F41B 6/00 180/65.8
9,461,482 B2 * 10/2016 Cheng ..................... H02J 7/485
(Continued)

FOREIGN PATENT DOCUMENTS

EP 2 061 116 A1 5/2009
EP 2 079 148 A2 7/2009
(Continued)

OTHER PUBLICATIONS

International Search Report mailed on Feb. 24, 2022 in PCT /EP2021/080311 filed on Nov. 2, 2021 (2 pages).

*Primary Examiner* — Jared Fureman
(74) *Attorney, Agent, or Firm* — Oblon, McClelland, Maier & Neustadt, L.L.P.

(57) ABSTRACT

The invention relates to an electric power supply system for an item of electrical equipment, which comprises:
- a DC power supply bus,
- a first battery (BATT1) and a second battery (BATT2) which are connected in parallel and each able to deliver a first DC voltage on said DC power supply bus, (Continued)

an auxiliary battery (B_AUX) configured to deliver a second DC voltage (U_AUX),
a control unit (UC) configured to:
select at least one battery from among the first battery and the second battery in order to set said voltage on the DC power supply bus by connecting it to the DC power supply bus,
order the unselected battery to be connected to the DC power supply bus, and said auxiliary battery (B_AUX) to be charged by placing it in series with the unselected battery and by switching the cells of said unselected battery in order to control a charge current (I_aux) for said auxiliary battery.

15 Claims, 7 Drawing Sheets

(51) Int. Cl.
*B60L 58/21* (2019.01)
*B60L 58/22* (2019.01)
*H02J 7/56* (2026.01)
*H02J 7/82* (2026.01)

(52) U.S. Cl.
CPC .................. *H02J 7/56* (2026.01); *H02J 7/82* (2026.01); *B60L 2240/547* (2013.01)

(58) Field of Classification Search
CPC ........ H02J 7/82; H02J 7/02; H02J 7/50; H02J 7/575; H02J 1/082; H02J 1/084; H01M 10/441
See application file for complete search history.

(56) References Cited

U.S. PATENT DOCUMENTS

| | | | | |
|---|---|---|---|---|
| 10,286,805 | B2 * | 5/2019 | Eun | H02J 7/00 |
| 10,457,155 | B2 * | 10/2019 | Wu | B60L 58/12 |
| 11,338,690 | B2 * | 5/2022 | Bernardini | B60L 1/20 |
| 11,358,486 | B2 * | 6/2022 | Li | B60L 53/62 |
| 2017/0368958 | A1 * | 12/2017 | Eun | H01M 10/488 |
| 2018/0043789 | A1 | 2/2018 | Goetz | |

FOREIGN PATENT DOCUMENTS

| | | | | |
|---|---|---|---|---|
| JP | 2010022108 A * | 1/2010 | | B60L 58/14 |
| WO | WO-2013002120 A1 * | 1/2013 | | H02J 7/933 |

* cited by examiner

BATT

Cell_x
S_x1
C_x
S_x2
M_y

ELECTRIC POWER SUPPLY SYSTEM

TECHNICAL FIELD OF THE INVENTION

The present invention relates to an improved electric power supply system, which may notably be used in an electric or hybrid vehicle.

PRIOR ART

The traction of an electric or hybrid vehicle is made possible by using several electrical energy storage batteries, grouped together in a battery pack.

In a known manner, a battery pack delivers a DC voltage which a DC/AC converter is tasked with converting in order to deliver control voltages to the electric motor of the vehicle on its two or three phases (according to the configuration of the motor). The battery pack may comprise several batteries, each battery itself comprising several modules and each module generally comprising several electrochemical cells. The system may be reversible and the mechanical braking of the motor may also make it possible to recharge the batteries of the battery pack, in energy regeneration mode.

Furthermore, it is known that, in order to supply power to the on-board network of the vehicle, that is to say, for example, the headlights, the windows, the ABS, the power steering, but also rather more basic functions such as remote-controlled centralized opening/closing, a standard 12 V (or 24 V) lead battery is often used. The presence of this additional lead battery is justified by the need to have a voltage of 12 V even when the vehicle is not on and by the need to have an independent 12 V source which does not discharge the traction battery. This auxiliary battery is charged by the battery pack of the vehicle in the case of an electric or hybrid vehicle, through a DC/DC converter, or by an alternator in the case of a combustion vehicle.

In applications other than a motor vehicle, an additional battery may also be necessary for starting the system.

For the sake of weight, bulk and cost savings, it is desirable to dispense with the use of this DC/DC converter (or the alternator in the case of a combustion vehicle). In this situation, it is all the same necessary to have a simple solution for charging the auxiliary battery, whatever the architecture of the system and its operating mode, that is to say normal power supply mode, (regenerative) braking mode or charge or discharge mode on the AC network.

The installation of the auxiliary battery will notably have to be able to be adapted to an architecture which is capable of permanently delivering a constant DC voltage, for example of 48 VDC or 400 VDC in an electric vehicle, through a DC power supply bus.

The patent application EP 2079148A2 already describes an architecture used in an electric or hybrid vehicle, which is capable of delivering different voltage levels, without using DC/DC converters.

The patent application US2018/043789A1 also describes an electric power supply system which is able to do without DC/DC converters.

However, these prior solutions are often not adapted to making it possible both to:

- maintain a constant voltage on the bus, and
- also make it possible to recharge an auxiliary battery.

The aim of the invention is therefore to propose an electric power supply system which:

- is able to permanently deliver a DC voltage at a substantially constant level (to within 5 V), when the vehicle is in operation;
- integrates an auxiliary battery into its architecture and makes it possible to recharge it without using a converter;
- may be able to recharge on an external AC network while at the same time keeping delivering a DC voltage (low or high voltage);
- may be able to deliver an AC voltage while at the same time keeping delivering a DC voltage;
- as far as possible avoids using electrical converters.

This system will notably be adapted to being used in an electric or hybrid vehicle to participate in the traction of the vehicle but also to supply power to various items of equipment of the vehicle.

SUMMARY OF THE INVENTION

This aim is achieved by an electric power supply system for an item of electrical equipment, which comprises:

- a DC power supply bus,
- a first battery which is able to deliver a first DC voltage on said DC power supply bus, said first battery comprising first cells, each of which may be switched between an active state and an inactive state,
- an auxiliary battery configured to deliver a second DC voltage, which is distinct from the first DC voltage,
- a control unit,
- a second battery which is able to deliver said first DC voltage on said DC power supply bus, said second battery being connected in parallel with said first battery, said second battery comprising second cells, each of which may be switched between an active state and an inactive state,
- first switching means arranged to connect or disconnect the first battery from the DC power supply bus,
- second switching means arranged to connect or disconnect the second battery from the DC power supply bus,
- third switching means configured to connect or disconnect the auxiliary battery in series with the first battery and/or in series with the second battery,
- said control unit being configured to:
  - select at least one battery from among the first battery and the second battery in order to set said voltage on the DC power supply bus by connecting it to the DC power supply bus,
  - order the unselected battery to be connected to the DC power supply bus, and said auxiliary battery to be charged by placing it in series with the unselected battery and by switching the cells of said unselected battery in order to control a charge current for said auxiliary battery.

The architecture of the invention has the advantage of being totally symmetrical, in the sense that it makes it possible to select one or other of the two main batteries to deliver the voltage on the bus, and to use the unselected battery to possibly charge the auxiliary battery.

According to one particular feature, the first switching means are arranged to connect or disconnect the first battery to a charge/discharge unit intended to be connected to an AC network.

According to another particular feature, the second switching means are arranged to connect or disconnect the second battery to said charge/discharge unit.

According to another particular feature, the control unit is configured to order the unselected battery to be charged by being connected to said charge/discharge unit.

According to another particular feature, the control unit is configured to order a variable voltage to be delivered to said charge/discharge unit by connecting the first battery or the second battery to said charge/discharge unit.

According to another particular feature, the control unit is configured to order the auxiliary battery to be connected in series with both the first battery and the second battery in order to charge the auxiliary battery using a current which is present on the DC power supply bus.

According to another particular feature, the control unit comprises means for monitoring the following quantities:

the voltage across the terminals of the first battery, the voltage across the terminals of the second battery, the voltage across the terminals of the auxiliary battery, the current which flows through a first branch bearing the first battery, the current which flows through the second branch bearing the second battery, the charge current for the auxiliary battery, the voltage of the DC power supply bus.

According to another particular feature, the control unit comprises means for determining and for monitoring the state of charge of the first battery, the state of charge of the second battery and the state of charge of the auxiliary battery, on the basis of the values of the quantities monitored.

According to another particular feature, the control unit comprises means for controlling the charge current for the auxiliary battery by applying phases of connecting and phases of disconnecting the auxiliary battery to said unselected battery.

According to another particular feature, the first battery and the second battery each comprise several cells connected in series and parallel, each cell comprising at least one capacitive component and some switching means.

The invention also relates to a control method implemented in the control unit of an electric power supply system as defined above, said method comprising the following steps:

selecting at least one battery from among the first battery and the second battery in order to deliver said voltage on the DC power supply bus by connecting it to the DC power supply bus, ordering the unselected battery to be connected to the DC power supply bus, and said auxiliary battery to be charged by placing it in series with the unselected battery and by switching the cells of said unselected battery in order to control a charge current for said auxiliary battery.

According to one particular feature, the control unit is configured to order the unselected battery to be charged by being connected to said charge/discharge unit.

According to another particular feature, the control unit is configured to order the auxiliary battery to be connected in series with both the first battery and the second battery in order to charge the auxiliary battery using a current (I_R) which is present on the DC power supply bus.

According to another particular feature, the control unit is configured to order a variable voltage to be delivered to said charge/discharge unit by connecting the first battery or the second battery to said charge/discharge unit.

The invention relates lastly to a use of the system as defined above in an electric or hybrid vehicle in order to supply power to one or more items of electrical equipment of said vehicle.

BRIEF DESCRIPTION OF THE FIGURES

Other features and advantages will become apparent from the following detailed description, which is given with reference to the appended figures listed below.

DETAILED DESCRIPTION OF AT LEAST ONE EMBODIMENT

In the rest of the description, the term "DC" means "direct current" and the term "AC" means "alternating current". Reference will also be made to "AC voltage" to designate a variable voltage and to "DC voltage" to designate a continuous voltage.

The invention relates to an electric power supply system for an item of electrical equipment. The system is notably perfectly adapted to being installed in an electric or hybrid vehicle. It is then located on board the vehicle and may participate in the traction of the vehicle or in the supply of power to various items of equipment of the vehicle.

The system comprises a DC power supply bus comprising two power supply lines L1, L2 between which a first DC voltage U_DC may be applied. This voltage may be generated directly by a battery pack of suitable capacity. For a battery pack used in an electric or hybrid vehicle, this first voltage may be, for example, 48 VDC or 400 VDC. Furthermore, in the event of the electric vehicle braking or when recharging via the combustion engine of a hybrid vehicle, a recharge current may appear on the bus.

The electric power supply system thus comprises at least one battery pack.

In the context of the invention, the battery pack comprises at least a first battery BATT1 and a second battery BATT2.

Each battery may comprise several modules, each module comprising several electrical energy storage cells.

By "cell", what is meant is an elementary cell or a group of elementary cells placed in series and/or in parallel. An "elementary cell" may be a storage element (battery cell, electrical capacitive component, micro-battery, etc.), a generator (fuel cell, zinc-air stack, photovoltaic cell) or a combination of the two (generator associated with a buffer storage element). A switchable cell, in the event that it is composed of a group of elementary cells placed in series and/or in parallel, may be switched between an active state and an inactive state holistically (the switching applies to the terminals of this group of elementary cells).

A battery pack is intended to deliver as output a first DC voltage U_DC (for example 48 VDC or 400 VDC) which is available on the DC power supply bus.

Figure 7:
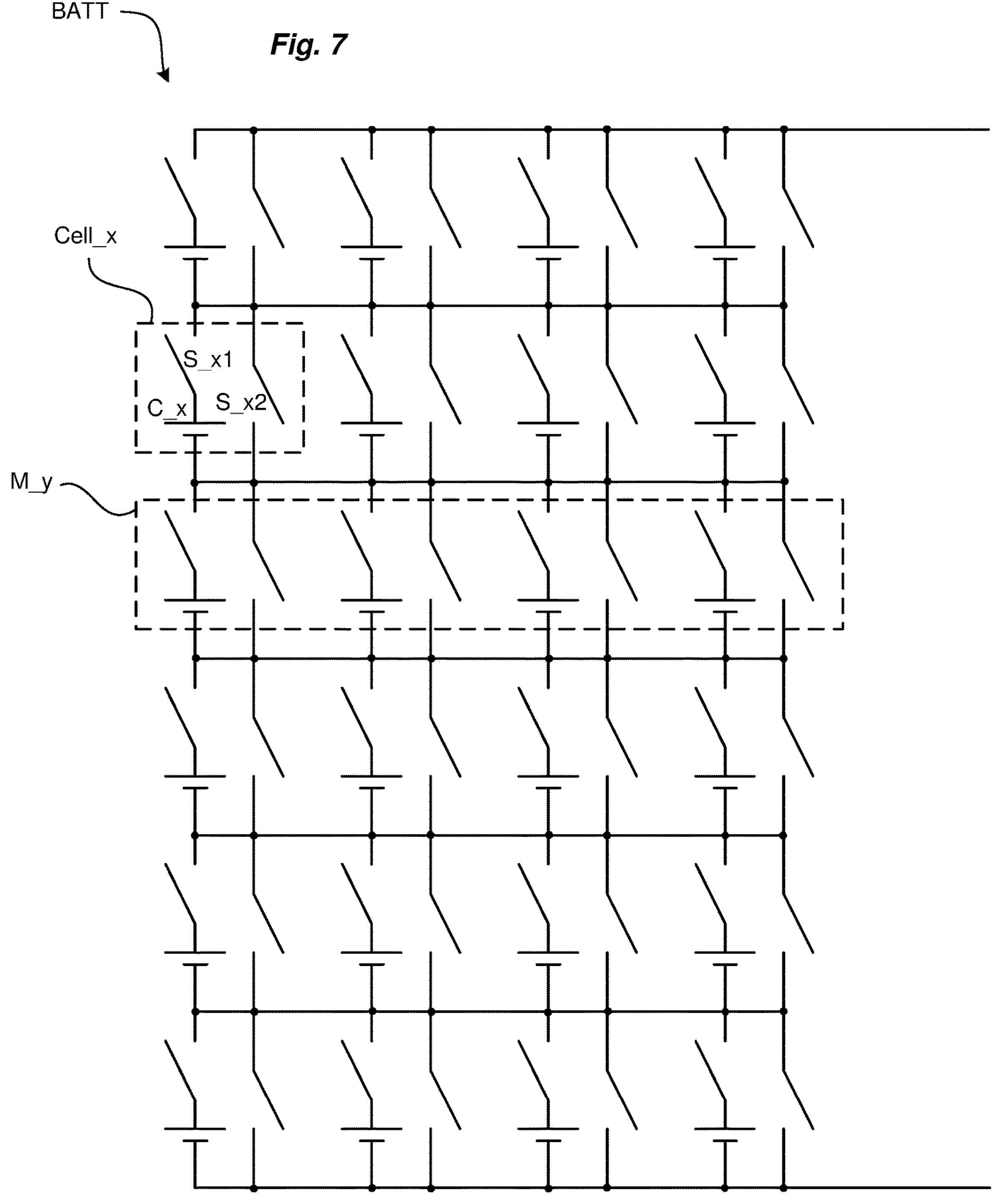
FIG. 7 shows one example of an embodiment of a switched-cell battery.

According to a particular feature of the invention illustrated by FIG. 7, each battery (BATT in FIG. 7) of the pack is produced according to an architecture referred to as a switched-cell architecture. This solution makes it possible to replace the (DC/DC or DC/AC) converter at the output of the battery pack. In this architecture, each cell Cell_x may be controlled individually. Several cells connected in series and/or parallel may form a module M_y. Each cell of the battery pack may, specifically, be switched between an active state and an inactive state by virtue of suitable switching means S_x1, S_x2 connected in series and parallel with its capacitive component C_x (of battery, capacitor or supercapacitor type). A control system is then tasked with controlling the switching means in order to make the voltage delivered by each battery in its entirety vary. This type of architecture is well-known and notably described in patent applications no. WO2013/007810A1, WO2012/117111A1, WO2012/117110A2, WO2012/117/109A1 and U.S. Pat. No. 9,493,090B2.

Figure 1:
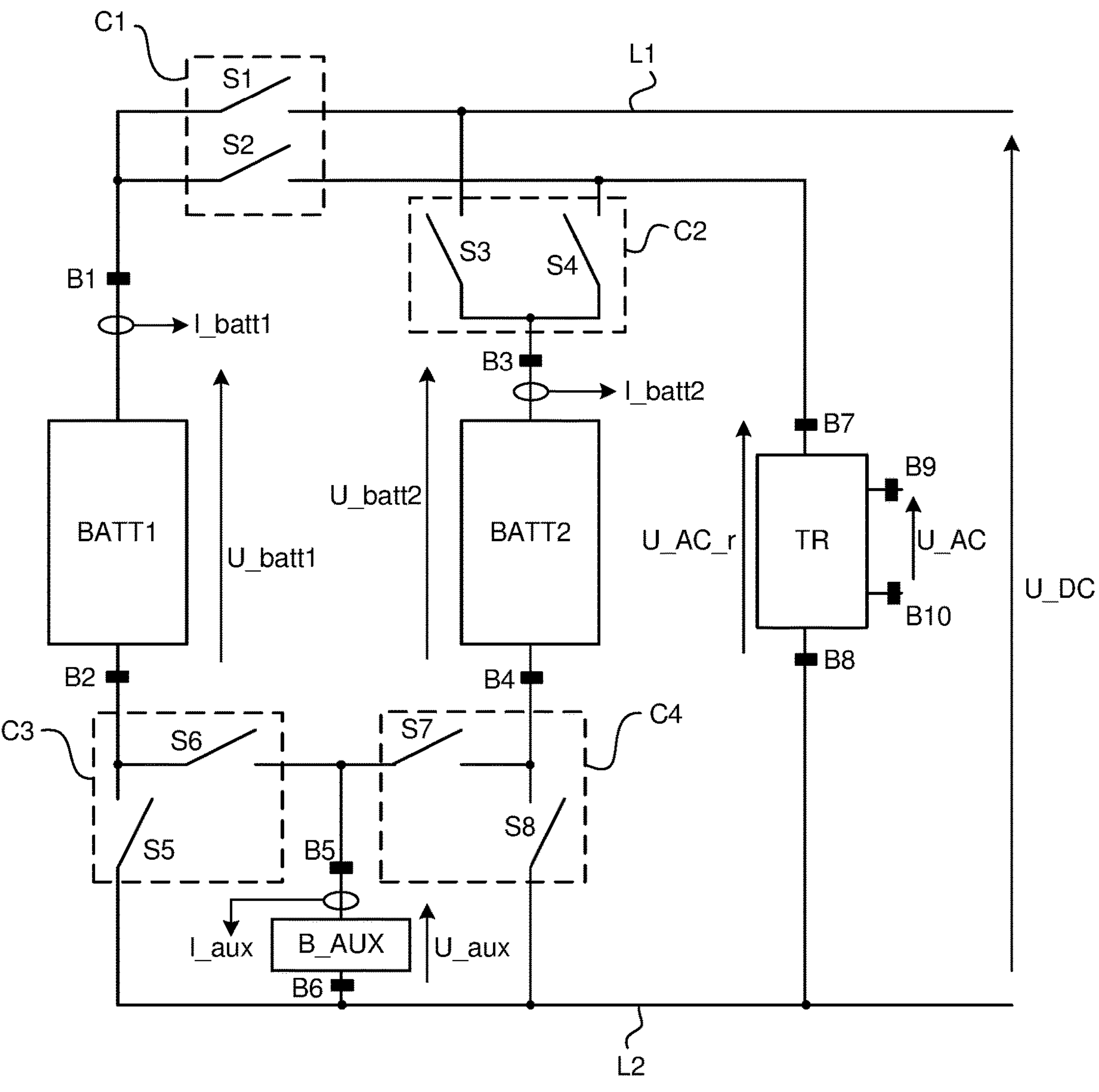
FIG. 1 schematically shows the electrical architecture of the system.

With reference to FIG. 1, the two batteries BATT1, BATT2 of the system are connected in parallel between the two power supply lines L1, L2 of the DC power supply bus and form two distinct branches, referred to as the first branch bearing the first battery BATT1 and the second branch bearing the second battery BATT2. The two batteries may thus operate redundantly in delivering the DC voltage on the DC power supply bus. When one of the two batteries is delivering the voltage U_DC of the DC power supply bus, the other battery may be charging on the AC network or delivering an AC voltage for components which are external to the system.

In this way, the system may be able to permanently maintain the voltage U_DC on the bus, by selectively connecting one or other of the two branches.

The first branch and the second branch each comprise two connection terminals, a first terminal (B1 for the first branch and B3 for the second branch) intended to be connected to the first power supply line L1 of the bus and a second terminal (B2 for the first branch and B4 for the second branch) intended to be connected (directly or indirectly) to the second power supply line L2 of the bus. It will be seen below that switching means are arranged to manage the selective connection of each branch to the DC power supply bus.

Furthermore, the system comprises a third battery, referred to as the auxiliary battery B_AUX. By way of example, it may be a lead battery, or indeed of iron-phosphate type, which is capable of delivering a voltage of 12 V or 24 V. It makes it possible, for example, to supply power to the on-board network of the vehicle, that is to say, for example, the headlights, the windows, the ABS, the power steering, but also rather more basic functions such as remote-controlled centralized opening/closing. The auxiliary battery B_AUX comprises two terminals B5, B6 in order to be integrated into the system.

The system may in addition have a transformer TR, forming a charge/discharge unit and comprising two terminals referred to as input terminals B7, B8 and two terminals referred to as output terminals B9, B10. Its two output terminals may be connected to the AC network in order to recharge the system. Furthermore, it is also possible to provide an AC voltage at the output of the transformer, between its two output terminals B9, B10, on the basis of a rectified voltage U_AC_r (for example 48 VAC rectified) delivered by one or other of the two batteries between the two input terminals B7, B8 of the transformer. In order to recharge on the network, the cells of the battery (BATT1 or BATT2) charging are switched in a way which is adapted to synchronizing with the AC network. For this purpose, the switched-architecture battery which has to recharge on the AC network is controlled by the control system so that the AC current of the battery is perfectly in phase with the voltage of the network. An algorithm, which has as input data the voltage of the AC network or its rectified image as well as the exchange current between the network and the battery, regulates the current exchanged with respect to a setpoint current, which is itself substantially in phase with the voltage of the network. In one particular embodiment, the potential difference at input (between the terminals B7-B8) is, via the operation of the transformer TR, an attenuated and rectified reproduction of the potential difference which is present between the output terminals (B9-B10). The current setpoint is then an image of the rectified network voltage, or indeed a rectified sinusoidal signal substantially in phase with the rectified network voltage.

The transformer may be of any type and formed of an assembly of several components, making it possible to recharge the batteries on the AC network and deliver an AC voltage. One example of an embodiment is presented in FIG. 7 and will be described below.

According to one particular aspect of the invention, the whole system may operate according to the various following modes:

- A first operating mode (MOD1), referred to as the normal operating mode: Delivering a constant DC voltage (for example 48 VDC or 400 VDC) on the DC power supply bus, in the absence of the network. Only one battery or both the batteries may be connected to the bus in order to set the DC voltage. One of the two batteries may also be configured to control a charge current for the auxiliary battery.
- A second operating mode (MOD2), of charging on the bus (in a regeneration mode or charge mode via the combustion engine): The system uses the current generated on the DC power supply bus to charge. One of the two batteries or both the batteries BATT1, BATT2 may charge simultaneously by virtue of the current which is present on the bus. It is also possible to control one of the two batteries in order to control a charge current for the auxiliary battery B_AUX, the other battery then absorbing the difference in current between the current which flows on the bus and the current which is absorbed by the battery which manages the charge of the auxiliary battery B_AUX. As a variant, it is also possible for the two batteries to contribute in parallel to charging the auxiliary battery B_AUX, while at the same time maintaining a constant DC voltage on the bus.
- A third operating mode (MOD3), of charging on the AC network: The system synchronizes one of the two batteries (BATT1 or BATT2) with the AC voltage of the network in order to charge via the transformer TR. Only one of the two batteries thus charges on the network, the second battery having to maintain the DC voltage of the bus (e.g. 48 VDC or 400 VDC). When the battery is charging on the network, the system may for its part also connect the auxiliary battery B_AUX in series and control a charge current for the auxiliary battery B_AUX. The same principle applies in the event of delivering a voltage U_AC outside the system (be this in order to deliver power to an electrical network or supply power to an external load). In this latter case, one of the two batteries is dedicated to delivering the voltage U_AC while the other keeps delivering a constant DC voltage on the bus. Advantageously, the control of the battery delivering the voltage U_AC may be adapted to the type of device connected at output (network or load). Notably, if it is the electrical network which is connected at output ("vehicle-to-grid" use), the control of the battery advantageously makes it possible to control the phase and the amplitude of the output current with respect to the voltage of the network.

In order to select the various operating modes and make it possible to charge the auxiliary battery, the system comprises various switching means. Generally, these switching means have to make it possible to:

- connect each battery BATT1, BATT2 in a distinct manner to the two lines of the bus or to the two terminals of the transformer;
- connect the auxiliary battery B_AUX in series with the first battery and/or in series with the second battery;
- bypass the auxiliary battery B_AUX.

In other words, it is a case of making it possible to connect, as desired, between the two lines of the DC power supply bus or between the two terminals of the transformer:

- only the first battery or only the second battery, or
- the two batteries simultaneously, in parallel, or
- an assembly of the first battery+auxiliary battery in series, or
- an assembly of the second battery+auxiliary battery in series, or
- an assembly of the first battery+second battery+auxiliary battery.

In order to fulfill these objectives, the system may comprise various switching means. With reference to the appended figures, non-limitingly, the system may thus comprise:

- first switching means C1 arranged in series with the first battery BATT1 and intended to connect the first battery to the first power supply line of the bus or to the first terminal of the transformer;
- second switching means C2 arranged in series with the second battery BATT2 and intended to connect the second battery to the first power supply line of the bus or to the first terminal of the transformer;
- third switching means C3 arranged to connect the first branch between the two power supply lines of the bus, directly or through the auxiliary battery B_AUX; the auxiliary battery is then placed in series with the first battery;
- fourth switching means C4 arranged to connect the second branch between the two power supply lines of the bus, directly or via the auxiliary battery B_AUX; the auxiliary battery is then placed in series with the second battery.

By way of example, the first switching means C1 may comprise a first switch S1 arranged between the first terminal of the first branch and the first power supply line and a second switch S2 arranged between the first terminal of the first branch and the first terminal of the transformer.

By way of example, the second switching means C2 may comprise a first switch S3 arranged between the first terminal of the second branch and the first power supply line and a second switch S4 arranged between the first terminal of the second branch and the first terminal of the transformer.

By way of example, the third switching means C3 may comprise a first switch S5 arranged between the second terminal of the first branch and the second power supply line and a second switch S6 arranged between the second terminal of the first branch and the first terminal of the auxiliary battery, the second terminal of the auxiliary battery being connected directly to the second power supply line.

By way of example, the fourth switching means C4 may comprise a first switch S8 arranged between the second terminal of the second branch and the second power supply line and a second switch S7 arranged between the second terminal of the second branch and the first terminal of the auxiliary battery, the second terminal of the auxiliary battery being connected directly to the second power supply line.

Figure 2:
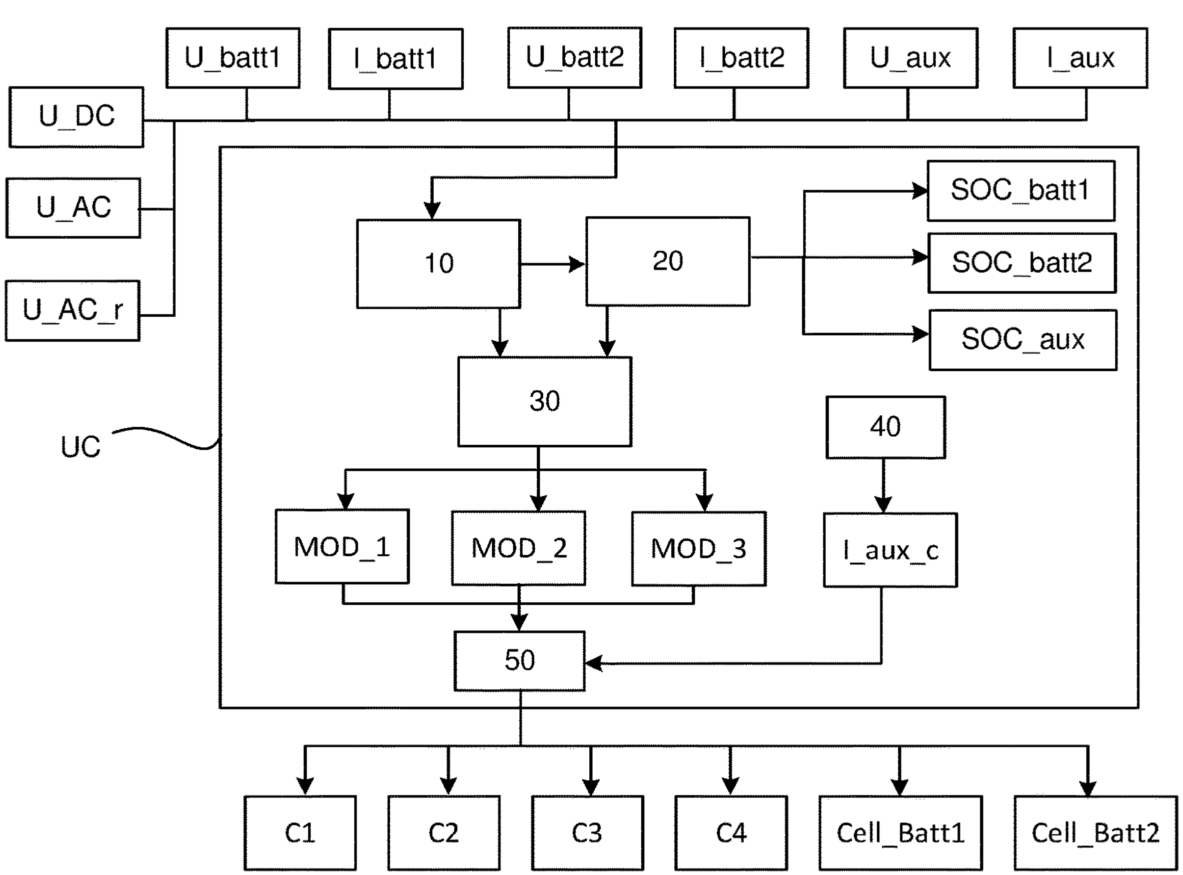
FIG. 2 schematically shows the control architecture of the system.

Furthermore, with reference to FIG. 2, in order to manage the operating modes MOD1, MOD2, MOD3, the system comprises:

- means for measuring the voltage U_batt1 across the terminals of the first battery;
- means for measuring the current I_batt1 flowing through the first branch;
- means for measuring the voltage U_batt2 across the terminals of the second battery;
- means for measuring the current I_batt2 flowing through the second branch;
- means for measuring the voltage U_AC_r between the input terminals of the transformer;
- means for measuring the voltage U_AC between the output terminals of the transformer;
- means for communicating control orders to the various switching means;
- means for measuring the temperature of the cells of each battery of the system.

The system comprises a control and processing unit UC tasked with managing the various operating modes and with controlling the switching means and the cells of each battery in order to implement the selected operating mode. The control unit thus comprises:

- means 10 for monitoring the following quantities:
  - the voltage U_batt1 across the terminals of the first battery,
  - the voltage U_batt2 across the terminals of the second battery,
  - the voltage U_aux across the terminals of the auxiliary battery,
  - the current I_batt1 which flows through the first branch,
  - the current I_batt2 which flows through the second branch,
  - the charge current I_aux for the auxiliary battery B_AUX,
  - the voltage U_DC of the DC power supply bus,
  - the voltage U_AC which is present across the output terminals of the transformer,
  - the voltage U_AC_r which is present across the input terminals of the transformer;
- means 20 for determining and for monitoring the state of charge SOC_batt1 of the first battery, the state of charge SOC_batt2 of the second battery and the state of charge SOC_aux of the auxiliary battery, on the basis of the values of the quantities monitored;
- means 30 for determining the operating mode (MOD1, MOD2 or MOD3) to be applied, taking into account various constraints:
  - keeping the voltage U_DC on the bus at a substantially constant level;
  - keeping the state of charge of the first battery and of the second battery above a defined threshold or at substantially identical levels (e.g. balancing voltage, or balancing state of charge possibly weighted by temperature, aging, availability of power, etc.);
  - keeping the state of charge of the auxiliary battery above a defined threshold;
- means 40 for determining the charge current I_aux_c to be applied to the auxiliary battery B_AUX; it may be a case, depending on the state of charge of the auxiliary battery, of modulating the magnitude of the charge current I_aux_c in order to optimize the quality of the recharge. In a low state of charge SOC_aux of the auxiliary battery, a large charge current may be delivered and, at the end of charging, a reduction in its magnitude will make a deeper recharge possible. In any case, a maximum charge current must not be exceeded. This maximum charge current may be determined a priori by the manufacturer, for example depending on temperature and on condition of not departing from the allowed voltage range. Optimally, this maximum charge current may depend on the state of charge of the auxiliary battery B_AUX, on its state of health and on its internal impedance, so as to prolong its service life without excessively compromising its recharge time. Then, in the application, one of the objectives is to keep this auxiliary battery B_AUX as charged as possible so that it remains completely available. It is a case of taking advantage of all the phases where the current is negative on the DC bus and/or in the presence of AC recharge power from the network in order to keep it charged. It should be noted that the worst operating case may be the mode referred to as the "normal" mode MOD1 summarized above, in which the auxiliary battery B_AUX is not necessarily recharged. In this case, the auxiliary battery is not recharged as long as its state of charge SOC_aux is not critical and below a threshold. If the current requested on the DC bus is not too high, one of the two batteries BATT1 or BATT2 may switch to current regulation mode in order to recharge the auxiliary battery B_AUX. The sizing of the relative capacities (in Ah) between the auxiliary battery and the two batteries BATT1, BATT2 is such that, most of the time, the two batteries BATT1, BATT2 need to be recharged before the auxiliary battery is excessively discharged; this recharge mode therefore remains relatively rare. It makes it possible to satisfy extreme cases such as, for example, the vehicle being stationary or at a slow speed (low power drawn from BATT1 and BATT2) while the accessories, such as the power steering, are drawing a large current from the auxiliary battery;

means 50 for generating commands for the switching means in order to place the system in the selected operating mode and for the switched cells Cell_Batt1, Cell_Batt2 of one or the other of the batteries in order to adjust the charge current for the auxiliary battery B_AUX.

It should be noted that, taking into account the data collected, the control and processing unit UC is able to control the transition from one operating mode to another, notably to switch from the first battery BATT1 to the second battery BATT2, or vice versa, in order to deliver the voltage on the DC bus, and to do the same in order to recharge the auxiliary battery B_AUX. The system may thus be caused to be permanently reconfigured, notably in order to guarantee that the system is well-balanced (in terms of energy, heat, etc.); this advantage is obtained with the symmetrical structure proposed here (the two main batteries may be used statistically in the same way, notably ensuring uniform aging and state of charge).

In each of the three operating modes summarized above, it is possible to make provision for connecting the auxiliary battery B_AUX in order to charge it, as detailed below.

Figure 3A:
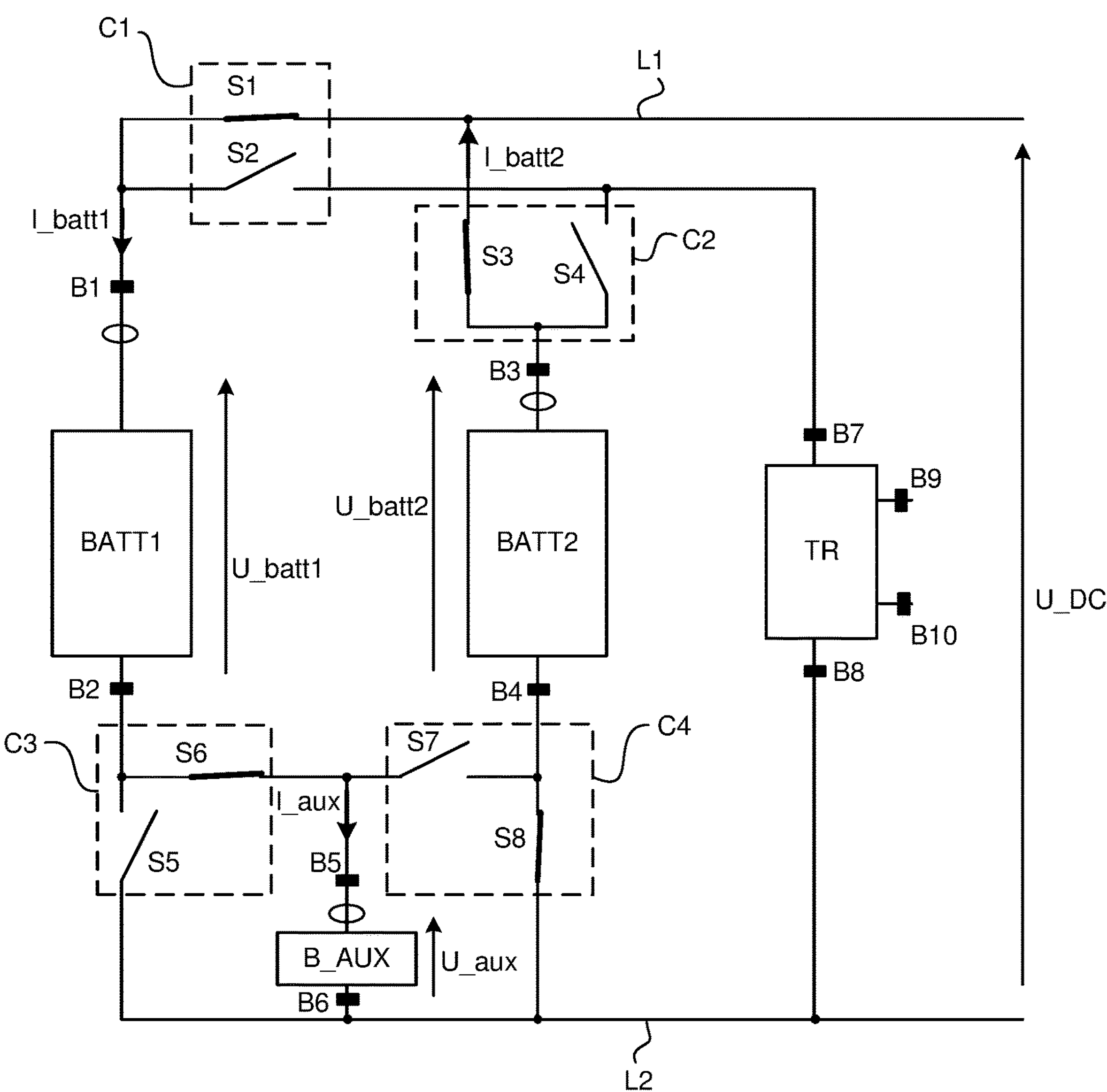
FIG. 3A, FIG. 3B and FIG. 3C show the electrical architecture of FIG. 1, controlled in order to apply the three operating modes of the system.

First operating mode—FIG. 3A: One of the two batteries, for example the second battery BATT2, is connected to the DC power supply bus in order to deliver the voltage U_DC on the bus and the auxiliary battery B_AUX may be connected in series with the other battery, here the first battery BATT1. A current I_batt2 may be generated by the second battery BATT2. The first battery BATT1 is thus connected to the bus in order to draw a charge current I_batt1 and is controlled by the control unit in order to deliver the charge current I_aux adapted to charging the auxiliary battery B_AUX. Of course, it is possible to invert the operation between the first battery and the second battery.

FIG. 3A illustrates the architecture of the system for implementing this first operating mode. In FIG. 3A, it may be seen that:

The second branch is connected to the DC power supply bus, by closing the switch S3 and the switch S8.

The first branch is connected to the DC power supply bus via the auxiliary battery, by closing the switch S1 and the switch S6.

A variant of this operating mode consists in connecting the two batteries BATT1 and BATT2 to the DC power supply bus in order to deliver the voltage U_DC on the bus, and in disconnecting the battery B_AUX from the batteries BATT1 and BATT2 by opening the switches S6 and S7. This operating mode may be advantageous if high power is requested on the bus.

Figure 3B:
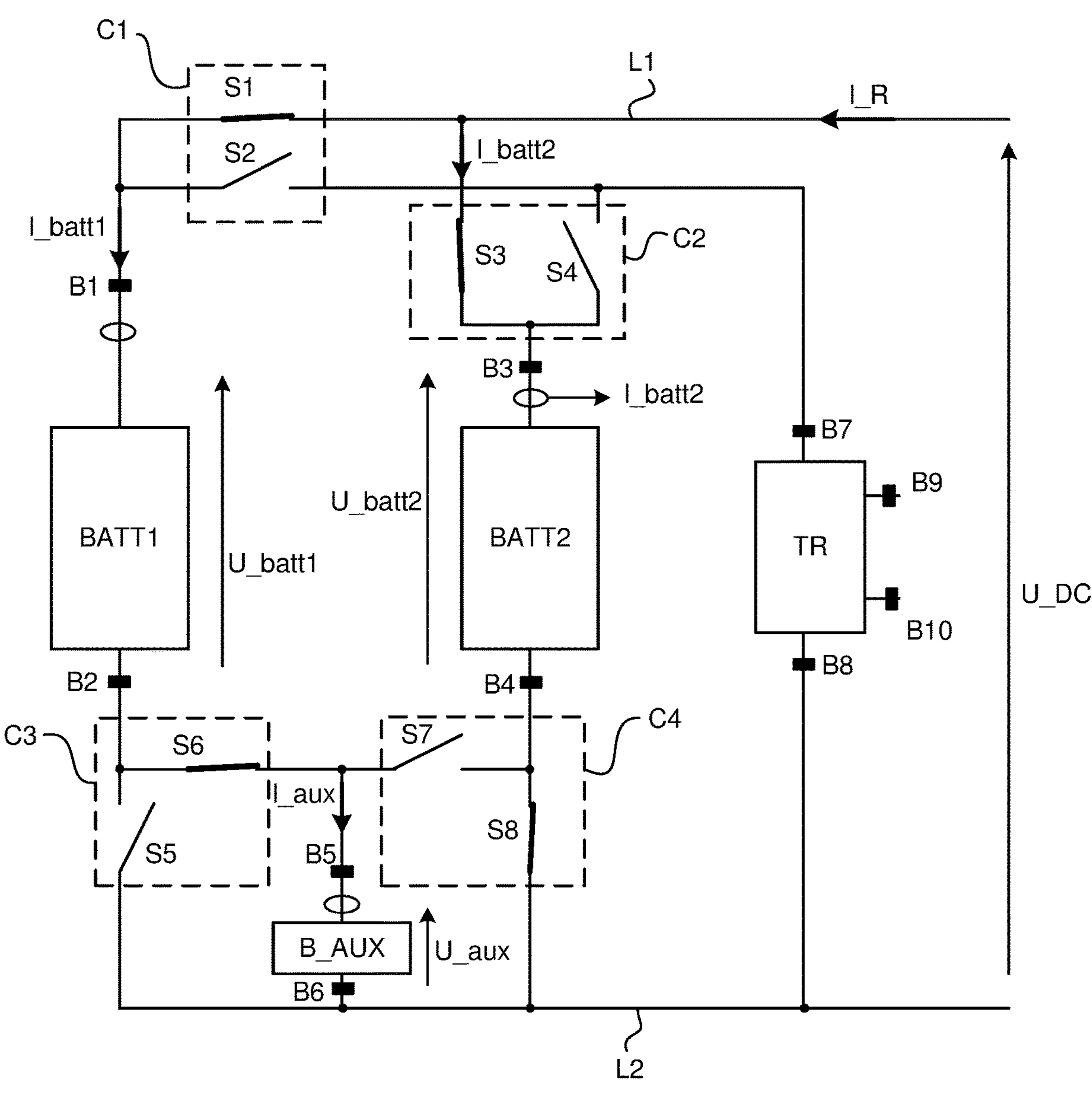

Second operating mode—FIG. 3B: A current I_R is generated on the DC power supply bus (in regenerative braking mode or generated by virtue of the combustion engine of the vehicle). This current I_R may be used to charge the auxiliary battery. The auxiliary battery B_AUX is thus connected in series with at least one of the two batteries, for example the first battery BATT1, and the latter is connected to the bus and controlled by the control unit UC in order to generate the charge current I_aux adapted to charging the auxiliary battery B_AUX. The second battery BATT2 may also be connected to the bus in order to charge with the current I_R which is available on the bus.

FIG. 3B illustrates the architecture of the system for implementing the second operating mode. In FIG. 3B, it may be seen that:

The second branch is connected to the DC power supply bus, by closing the switch S3 and the switch S8.

The first branch is connected to the DC power supply bus via the auxiliary battery, by closing the switch S1 and the switch S6.

According to the charge current desired for the auxiliary battery B_AUX, the second battery BATT2 may also be connected in series with the auxiliary battery B_AUX by closing the switches S3 and S7 and by opening the switch S8. The auxiliary battery B_AUX then sees all of the recharge current I_R.

It should be noted that, when the auxiliary battery B_AUX is connected in series with the two batteries BATT1, BATT2 at the same time, the charge current I_aux for the auxiliary battery may not be regulated and then corresponds directly to the recharge current I_R.

Figure 3C:
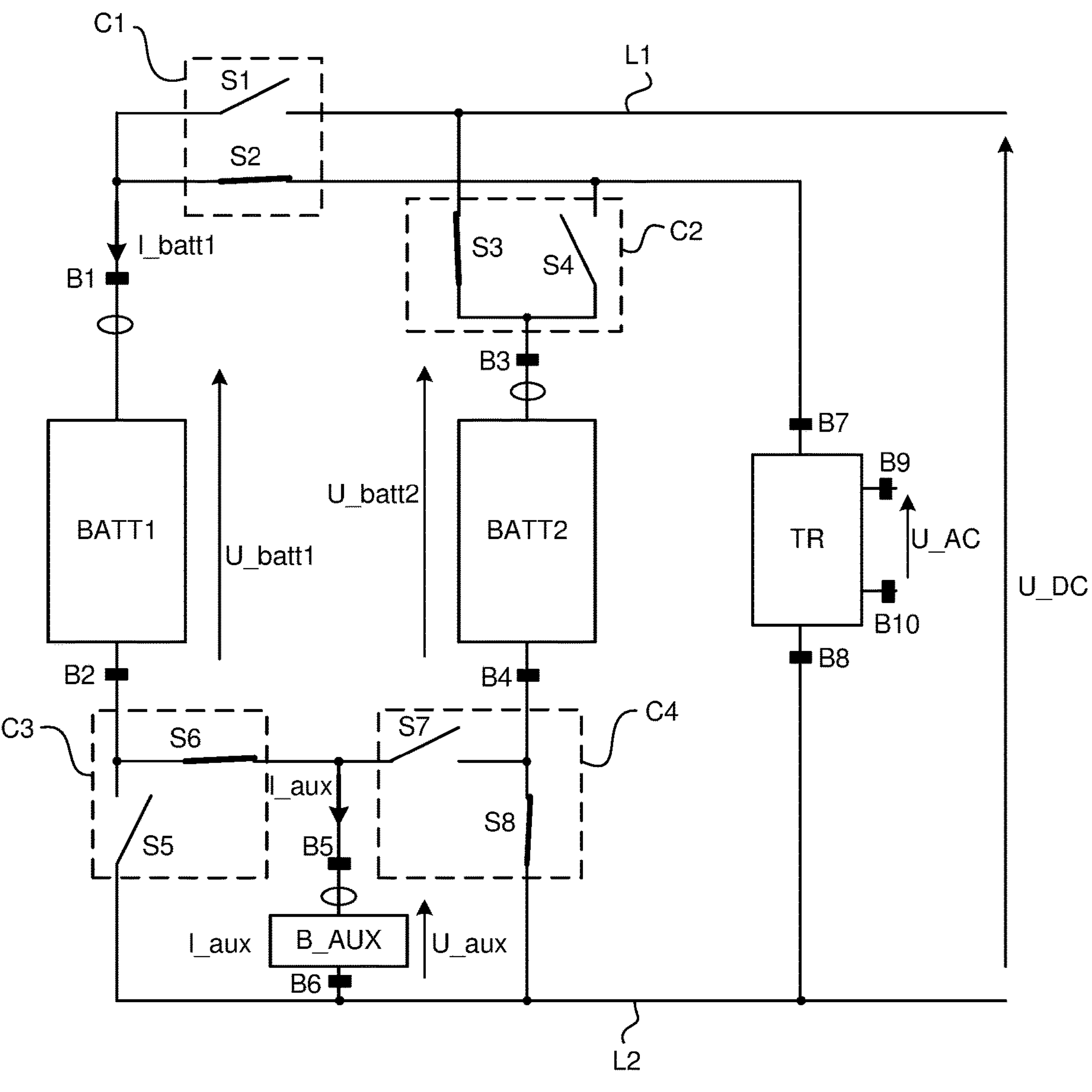

Third operating mode—FIG. 3C: One or other of the two batteries (BATT1) is charging on the AC network via the transformer TR. If necessary, the other battery, which is not charging, may continue to deliver the DC voltage. The auxiliary battery B_AUX may be recharged through the branch which is charging and connected to the AC network. Its charge is controlled depending on the voltage level of the network, on the current flowing through the cells of the battery BATT1 and according to its state of charge. As soon as the network voltage is greater than 12 V, it is possible to connect the auxiliary battery B_AUX. The connection time of the auxiliary battery B_AUX depends on its state of charge.

FIG. 3C illustrates the architecture of the system for implementing the third operating mode. In this figure, it may be seen that:

- The second branch is connected to the DC power supply bus, by closing the switch S3 and the switch S8.
- The first branch is connected to the transformer via the auxiliary battery, by closing the switch S2 and the switch S6. In this configuration, it should be noted that it may prove necessary to open the switch S6 and to close the switch S5 when the potential difference between the input terminals B7 and B8 of the transformer falls below the voltage U_aux which is present across the terminals of the auxiliary battery.

Figure 4:
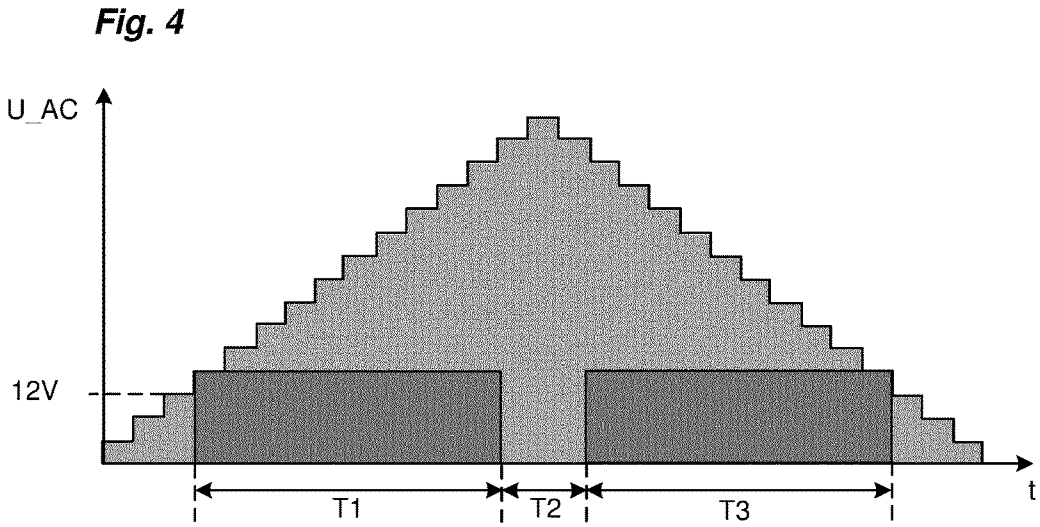
FIG. 4 illustrates the principle of charging the auxiliary battery when charging on the network.

FIG. 4 illustrates the operating principle of the third operating mode. This figure shows a time diagram schematically illustrating the principle of connecting and of disconnecting the auxiliary battery B_AUX when it is charging. In this diagram, it may be seen that, when the voltage U_AC exceeds 12 V, the auxiliary battery B_AUX is connected for a period T1. In this configuration, as the auxiliary battery B_AUX sees all the charge current for the battery to which it is connected, in order to adjust the power delivered to the auxiliary battery, it is disconnected for a period T2. This disconnection period T2 may be of any width between 0 and the temporal distance which separates the start of the period T1 from the end of the period T3. Likewise, it may have any temporal position, from the moment when the period T2 falls between the start of the period T1 and the end of the period T3. As a variant, between the start of the period T1 and the end of the period T3, the period T2 may be distributed in the form of several disconnection regions.

Figure 5:
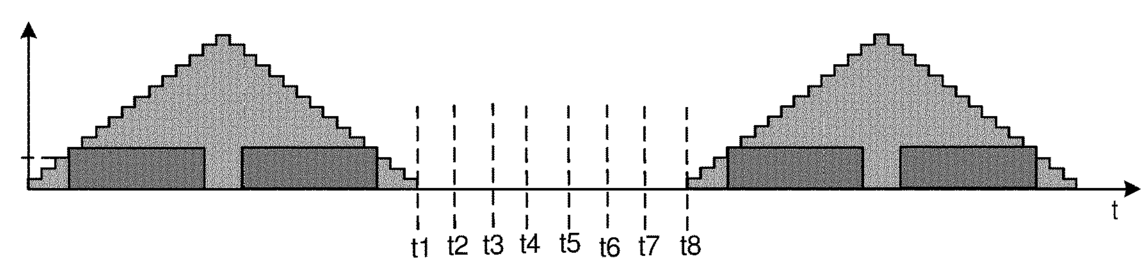
FIG. 5 illustrates the principle of switching between the two batteries of the system, making it possible to keep delivering the DC voltage.

The diagram shown in FIG. 5 indicates how to switch the two batteries BATT1, BATT2 without, however, modifying the principle of recharging the auxiliary battery when recharging on the AC network.

In order to switch the functions which each branch of the pack performs and thus maintain the voltage U_DC, the control unit UC has to follow the following steps:

- Initially, one of the two batteries (BATT1) delivers the voltage U_DC and the other battery (BATT2) is connected to the transformer in order to deliver an AC voltage which is useful outside the system or in order to charge on the AC network.
- At t1: ordering the cells of the second battery BATT2 to be switched in order to stop the charge (at zero voltage, for example).
- At t2: controlling the second switching means C2 in order to disconnect the battery BATT2 from the network.
- At t3: ordering the cells of the second battery BATT2 to be switched in order to generate the voltage V_DC (for example 48 VDC or 400 VDC).
- At t4: controlling the first switching means C1 and the second switching means C2 in order to connect the first battery BATT1 and the second battery BATT2 to the DC power supply bus. The two batteries are then in parallel in order to deliver the voltage U_DC.
- At t5: ordering the cells of the first battery to be switched in order to stop it delivering the voltage U_DC.
- At t6: controlling the first switching means C1 in order to disconnect the first battery BATT1 from the DC power supply bus.
- At t7: ordering the cells of the first battery BATT1 to be switched in order to follow the network voltage U_AC.
- At t8: controlling the first switching means in order to connect the first battery BATT1 to the network (or in order to deliver a voltage which is useful outside the system).

The principle of connecting the auxiliary battery, as explained above in connection with FIG. 4, remains valid when switching between the two main batteries.

Figure 6:
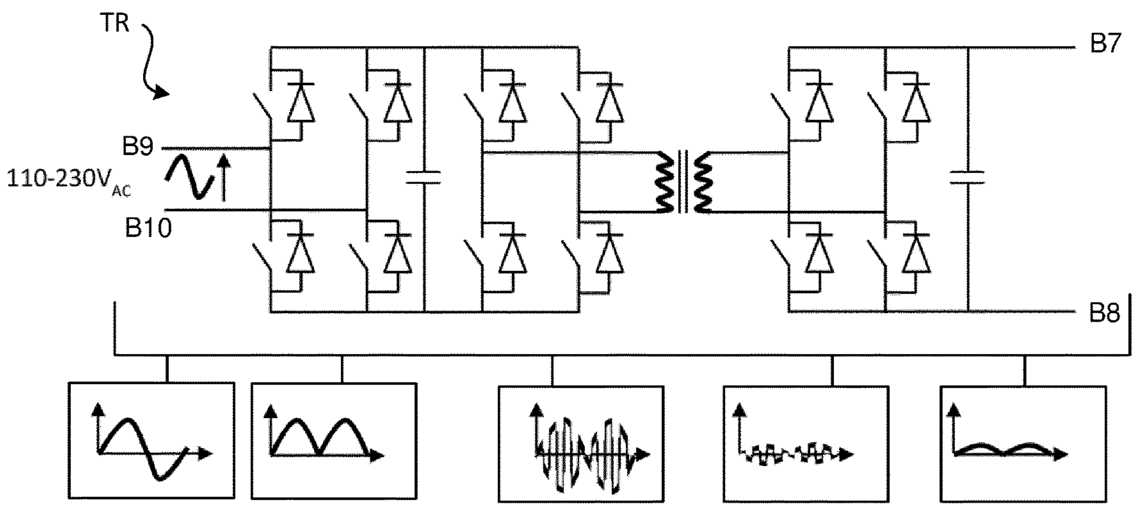
FIG. 6 shows one example of an embodiment of the transformer which may be used in the system of the invention.

With reference to FIG. 6, even if it does not form part of the core of the invention, it should be noted that the transformer TR may be a simple 50/60 Hz transformer associated with an active rectifier bridge. The 50/60 Hz transformer makes it possible to lower the voltage of the AC network before being rectified in order to generate a voltage which is compatible with the voltages which the first battery BATT1 and the second battery BATT2 may manage.

- When recharging on the network, its rectifier bridge may thus be in passive mode, the equivalent of a diode or active bridge for reducing losses in the switches.
- When an AC voltage is generated, for example of 110 V or 230 VAC, its rectifier bridge has to be controlled, so as to produce positive and negative half-waves, the two batteries BATT1 and BATT2 being able to generate only positive arches. The transformer then does indeed see an AC voltage, this being indispensable to its operation.

As a variant, it is also possible to use a transformer referred to as an HF ("high-frequency") transformer, which is less bulky. It is then a case of alternating, at high frequency (typically >10 kHz), the polarity of the input voltage before making it flow into the HF transformer. At the output of this transformer, the HF voltage is rectified and it may prove necessary to invert one in two "low-frequency" half-waves if the aim is to regain negative polarity.

In FIG. 6, below the diagram, the effects of each stage on the signal may be seen. The operation is bidirectional in terms of power from the moment when suitable commands are sent to the switches. It therefore makes it possible both to recharge from the network and to deliver an AC voltage, which is similar to that of the network, from the batteries.

It will be understood from the preceding text that the solution has many advantages, among which:

- it makes it possible to permanently deliver a constant voltage on the DC power supply bus, by making the two batteries redundant;
- it makes it possible to keep the auxiliary battery charged, in all the operating modes;
- it makes it possible to deliver the various voltages which are necessary for implementing the operating modes without specific DC/DC or DC/AC converters;
- it makes it possible to deliver an AC voltage for components which are external to the system.

The invention claimed is:

1. An electric power supply system for an item of electrical equipment, the system comprising:

- a DC power supply bus,
- a first battery configured to deliver a first DC voltage on said DC power supply bus, said first battery comprising first cells, each of which is configured to be switched between an active state and an inactive state,
- an auxiliary battery configured to deliver a second DC voltage, which is distinct from the first DC voltage,
- control circuitry,
- a second battery configured to deliver said first DC voltage on said DC power supply bus, said second battery being connected in parallel with said first battery, said second battery comprising second cells, each of which may be switched between an active state and an inactive state,
- first switches configured to connect or disconnect the first battery from the DC power supply bus, second switches configured to connect or disconnect the second battery from the DC power supply bus, and third switches configured to connect or disconnect the auxiliary battery in series with the first battery and/or in series with the second battery, wherein said control circuitry is configured to:

select at least one battery from among the first battery and the second battery in order to set said first DC voltage on the DC power supply bus by connecting the selected at least one battery to the DC power supply bus, and order the unselected battery to be connected to the DC power supply bus, and said auxiliary battery to be charged by placing the auxiliary battery in series with the unselected battery and by switching the cells of said unselected battery in order to control a charge current for said auxiliary battery.

2. The system as claimed in claim 1, wherein the first switches are configured to connect or disconnect the first battery to a charge/discharge unit to be connected to an AC network.

3. The system as claimed in claim 2, wherein the second switches are configured to connect or disconnect the second battery to said charge/discharge unit.

4. The system as claimed in claim 3, wherein the control circuitry is further configured to order the unselected battery to be charged by being connected to said charge/discharge unit.

5. The system as claimed in claim 2, wherein the control circuitry is further configured to order a variable voltage to be delivered to said charge/discharge unit by connecting the first battery or the second battery to said charge/discharge unit.

6. The system as claimed in claim 1, wherein the control circuitry is further configured to order the auxiliary battery to be connected in series with both the first battery and the second battery in order to charge the auxiliary battery using a current that is present on the DC power supply bus.

7. The system as claimed in claim 1, wherein the control circuitry is further configured to monitor:

the first DC voltage across terminals of the first battery, the first DC voltage across terminals of the second battery, the second DC voltage across terminals of the auxiliary battery, a current which flows through a first branch bearing the first battery, a current which flows through a second branch bearing the second battery, the charge current for the auxiliary battery, and the first DC voltage of the DC power supply bus.

8. The system as claimed in claim 7, wherein the control circuitry is further configured to determine and monitor a state of charge of the first battery, a state of charge of the second battery, and a state of charge of the auxiliary battery, based on values of quantities monitored.

9. The system as claimed in claim 1, wherein the control circuitry is further configured to control the charge current for the auxiliary battery by applying phases of connecting and phases of disconnecting the auxiliary battery to said unselected battery.

10. The system as claimed in claim 1, wherein the first battery and the second battery each comprise several cells connected in series and parallel, each cell comprising at least one capacitive component and a switch.

11. A control method implemented in the control circuitry of an electric power supply system as defined in claim 1, the method comprising:

selecting at least one battery from among the first battery and the second battery in order to deliver said first DC voltage on the DC power supply bus by connecting the selected at least one battery to the DC power supply bus, and ordering the unselected battery to be connected to the DC power supply bus, and said auxiliary battery to be charged by placing the auxiliary battery in series with the unselected battery and by switching the cells of said unselected battery in order to control a charge current for said auxiliary battery.

12. The method as claimed in claim 11, wherein the control circuitry is further configured to order the unselected battery to be charged by being connected to a charge/discharge unit.

13. The method as claimed in claim 12, wherein the control circuitry is further configured to order a variable voltage to be delivered to said charge/discharge unit by connecting the first battery or the second battery to said charge/discharge unit.

14. The method as claimed in claim 11, wherein the control circuitry is further configured to order the auxiliary battery to be connected in series with both the first battery and the second battery in order to charge the auxiliary battery using a current which is present on the DC power supply bus.

15. The use of the system as defined in claim 1 in an electric or hybrid vehicle in order to supply power to one or more items of electrical equipment of said vehicle.

* * * * *